(12) United States Patent
Buehne (10) Patent No.: US 9,200,448 B2
(45) Date of Patent: Dec. 1, 2015

(54) PLASTIC PROTECTIVE AND DECORATIVE PANELS HAVING IMPROVED RESISTANCE TO HEAT BUILD

(71) Applicant: William J. Buehne, Highland, IN (US)

(72) Inventor: William J. Buehne, Highland, IN (US)

(73) Assignee: CCL Label, Inc., Framingham, MA (US)

( * ) Notice: Subject to any disclaimer, the term of this patent is extended or adjusted under 35 U.S.C. 154(b) by 114 days.

(21) Appl. No.: 14/059,964

(22) Filed: Oct. 22, 2013

(65) Prior Publication Data

US 2014/0113117 A1   Apr. 24, 2014

Related U.S. Application Data

(60) Provisional application No. 61/716,691, filed on Oct. 22, 2012.

(51) Int. Cl.
*E04C 2/20* (2006.01)
*E04F 13/08* (2006.01)

(52) U.S. Cl.
CPC .............. *E04C 2/20* (2013.01); *E04F 13/0866* (2013.01); *B32B 2264/10* (2013.01); *B32B 2264/102* (2013.01); *B32B 2264/105* (2013.01); *B32B 2307/416* (2013.01); *B32B 2307/712* (2013.01); *Y10T 428/24802* (2015.01); *Y10T 428/24901* (2015.01); *Y10T 428/24975* (2015.01); *Y10T 428/265* (2015.01); *Y10T 428/31699* (2015.04); *Y10T 428/31928* (2015.04); *Y10T 428/31935* (2015.04)

(58) Field of Classification Search
CPC ................... E04C 2/20; E04F 13/0866; Y10T 428/24893; Y10T 428/24876; Y10T 428/24901; Y10T 428/24909; Y10T 428/24942; Y10T 428/24975; B32B 2264/102; B32B 2264/105; B32B 2307/416; B32B 2307/712
See application file for complete search history.

(56) References Cited

U.S. PATENT DOCUMENTS

5,284,693 A    2/1994   Spain et al.
6,336,988 B1   1/2002   Enlow et al.

*Primary Examiner* — Bruce H Hess
(74) *Attorney, Agent, or Firm* — McDonald Hopkins LLC (57) ABSTRACT

The present invention relates to a plastic panel construction with improved resistance to heat build. An outdoor weatherable panel comprises a substrate having an upper surface, a decorative layer disposed about the upper surface of the substrate, and a size coat layer disposed between the decorative layer and the substrate, where the size coat layer comprises an additive that is reflective to infrared radiation, ultraviolet radiation, or both. The additive can be a color pigment, a white pigment, a metallic pigment, or a combination of two of more thereof. The modified size coat layer provides a construction with excellent properties and improved resistance to heat build.

20 Claims, 2 Drawing Sheets

PLASTIC PROTECTIVE AND DECORATIVE PANELS HAVING IMPROVED RESISTANCE TO HEAT BUILD

REFERENCE TO RELATED APPLICATIONS

The present application claims priority to U.S. Provisional Application 61/716,691 entitled "Plastic Protective and Decorative Panels Having Improved Resistance to Heat Build," filed on Oct. 22, 2013, the entire disclosure of which is incorporated by reference herein in its entirety.

TECHNICAL FIELD

The present invention relates to a plastic panel useful in outdoor applications including in building applications. In particular, the present invention relates to a plastic panel exhibiting improved resistance to heat build. The present invention provides an outdoor, weatherable panel comprising a size coat layer configured to reflect ultraviolent and infrared light.

BACKGROUND

Outdoor weatherable plastic siding panels made from vinyl (polyvinylchloride or PVC) are extensively used in a wide range of buildings and throughout the construction industry. Wood, metal, and vinyl are materials commonly used as boards or shingles for siding in the construction and remodeling of commercial and residential structures. Painted wood is perhaps the most aesthetically pleasing of these materials to the consumer, but wood suffers from deterioration by rotting and attack by insects, rodents and birds. Wood surfaces need constant reprotection with paint, stains and water sealants.

Advantages of metal over wood include the ability to provide a baked-on finish that is more resistant to the elements than coatings applied to wood, which eliminates subsequent material and labor costs to the consumer. However, metal-based siding has less thermal insulation value and is sensitive to scratching and denting by hail and other blows to the surface. In addition, it does not have the pleasing look of a wood surface.

Despite the economical advantages of vinyl siding over most high quality wood and metal siding, vinyl may suffer from degradation from ultraviolet and infrared rays of the sun. Such degradation causes heat buildup, which results in warping, bowing, and oil canning of the vinyl siding.

Commercial vinyl siding is typically made by a process in which an extruded plastic sheet, e.g., PVC, has been layered with a clear coat known for its adhesive properties, one or two wood grain print coats, and a top coat. Currently, a color coat, e.g., a print coat to help give the appearance of wood grain, includes a pigment material to protect the plastic sheet from UV degradation. U.S. Pat. No. 5,284,693, for example, describes employing "dark pigments" in the print layers to prevent heat build. Yet, there still exists substantial heat build up in the vinyl from the sun. Thus, there is a need for decorative panel sheets with sufficiently low heat build up.

SUMMARY

The present invention provides a plastic panel configuration that exhibits excellent resistance to heat build. In one aspect, at least one of the size coat layer and the decorative layers is configured such that the size coat layer has a low transmittance to ultraviolet (UV) and/or infrared (IR) radiation. In one embodiment, at least one of the size coat layers and the decorative layers comprises a pigment that is non-absorbent to UV radiation, IR radiation, or both. It has been found that modifying the size coat and/or the decorative layers in such a manner can improve the resistance to heat build.

The present invention provides, in one aspect, an outdoor weatherable panel having a substrate having an upper surface and comprising a plastic material, a decorative layer disposed about the upper surface of the substrate, and a size coat layer disposed between the decorative layer and the substrate, wherein the size coat layer, the decorative layer, or both comprises an additive that is non-absorbent to or reflective to infrared radiation, ultraviolet radiation, or both.

In one aspect, the additive is chosen from a color pigment, a white pigment, a metallic pigment, or a combination of two of more thereof. In one embodiment, the additive is a white pigment. In one embodiment, the additive is an aluminum pigment, such as Metalure®.

In one embodiment, the size coat layer has a thickness of about 0.05 mils to about 0.1 mils. In one embodiment, the size coat layer has a thickness of about 1.25 microns to about 2.6 microns. In one embodiment, the size coat layer has a low-level range of pigment loading. In one embodiment, the size coat layer comprises acrylic resin. In one embodiment, the acrylic resin comprises a white pigment. In one embodiment, the size coat layer has a total solar reflectance (TSR) of about 0.333. The TSR is for the whole product, not just the size coat. In comparison, the control had a TSR of 0.304.

The present invention also provides an outdoor weatherable panel having a substrate having an upper surface and comprising a plastic material, a decorative layer disposed about the upper surface of the substrate, a first size coat layer, and a second size coat layer. The first size coat layer is disposed between the substrate and the second size coat layer, and the second size coat layer is disposed between the first size coat layer and the decorative layer.

In one embodiment, the first size coat layer, the second size coat layer, or a combination thereof comprises an additive that is reflective to infrared radiation, ultraviolet radiation, or both. In one embodiment, the first size coat layer comprises a first amount of the additive and the second size coat layer comprises a second amount of the additive.

In one embodiment, the first size coat layer has a thickness of about 0.05 mils to about 0.1 mils and the second size coat layer has a thickness of about 0.05 mils to about 0.1 mils. In one embodiment, the first size coat layer has a thickness of about 1.25 microns to about 2.6 microns and the second size coat layer has a thickness of about 1.25 microns to about 2.6 microns.

In one embodiment, the first size coat layer has a first level of pigment loading and the second size coat layer has a second level of pigment loading, the first level of pigment loading being lower than the second level of pigment loading. In another embodiment, the first level of pigment loading is a low-level range of pigment loading. In another embodiment, the second level of loading is either a mid-level range of pigment loading or a high-level range of pigment loading.

In one embodiment, the first size coat layer, the second size coat layer, or a combination of both thereof comprises acrylic resin. In one embodiment, the acrylic resin comprises a white pigment.

In one embodiment, the panel has a total solar reflectance of about 0.333.

The present invention also provides a method of making the panel, providing a substrate having an upper surface, applying a size coat layer on the upper surface, and applying a decorative layer on the size coat layer.

In one embodiment, the present invention provides vinyl siding with superior outdoor, weatherable properties having the look of either a painted wood surface or natural unpainted wood grain.

These and other aspects of the invention will be more fully understood by referring to the following detailed description and the accompanying drawings.

DESCRIPTION OF THE DRAWINGS

Unless otherwise indicated, the illustrations in the above figures are not necessarily drawn to scale.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The apparatuses and methods disclosed in this application are described in detail by way of various embodiments, examples, and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc., can be made and may be desired for a specific application. In this disclosure, any identification of specific shapes, materials, techniques, arrangements, etc., are either related to a specific example presented or are merely a general description of such a shape, material, technique, arrangement, etc. Identifications of specific details or examples are not intended to be, and should not be, construed as mandatory or limiting unless specifically designated as such.

The present invention provides an outdoor, weatherable plastic panel or film suitable for use as a protective panel in a variety of applications including, but not limited to, for outdoor siding in buildings and construction applications. The plastic constructions exhibit improved resistance to UV and IR radiation and improved resistance to heat build.

Figure 1:
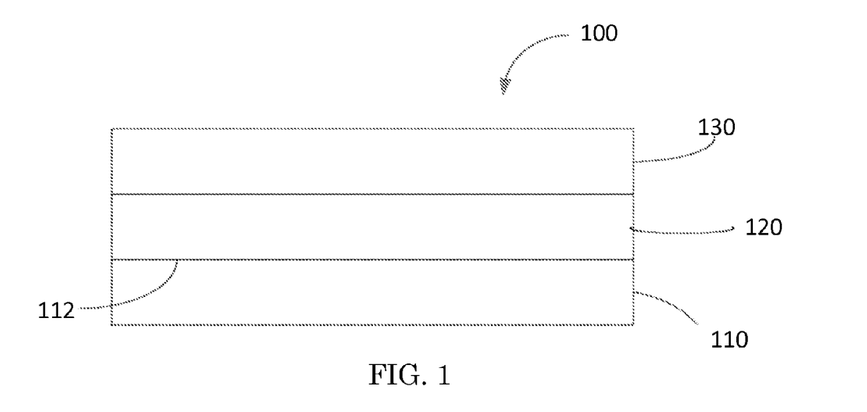
FIG. 1 is a schematic cross-sectional view illustrating components of one embodiment of an outdoor weatherable panel according to the invention.

FIG. 1 illustrates an outdoor weatherable panel 100 in accordance with one embodiment of the invention. Panel 100 comprises a substrate 110 that includes an upper surface 112. The substrate 110 comprises a plastic material. A size coat layer 120 is disposed on the upper surface 112 of the panel between the substrate 110 and a decorative layer 130. The decorative layer 130 is configured to provide the panel with a desired decorative finish, e.g., to resemble natural wood grain. In accordance with aspects of the present invention, at least one of the size coat layer 120 and the decorative layer 130 is configured such that it does not substantially absorb or transmit UV radiation, IR radiation, or both. In one embodiment, the size coat layer and/or the decorative layer comprises an additive that is reflective to or exhibits a relatively low transmittance to UV radiation, IR radiation, or both. In one embodiment, the size coat layer and/or the decorative layer comprises an additive that is reflective to infrared radiation, ultraviolet radiation, or both.

Figure 2:
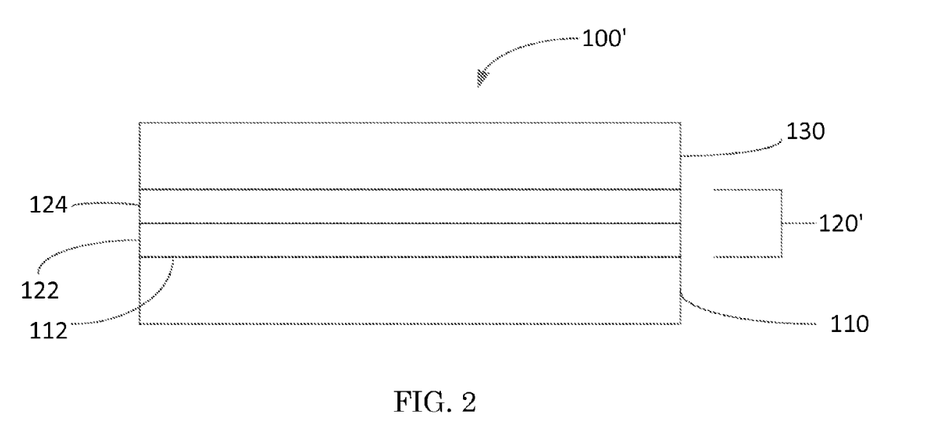
FIG. 2 is a is a schematic cross-sectional view illustrating components of another embodiment of an outdoor, weatherable panel according to the invention.

FIG. 2 illustrates another embodiment of outdoor weatherable panel 100'. Panel 100' in FIG. 2 is similar to panel 100 of FIG. 1 except that the size coat layer 120' in FIG. 2 comprises two size coat layers, layers 122 and 124, disposed on the substrate 110. A first size coat layer 122 is disposed on the upper surface 112 of the substrate 110, and a second size coat layer 124 is disposed on the first size coat layer 122. At lease one of the first size coat layer 122 and the second size coat layer 124 comprises, and, in one embodiment, both size coat layers comprise an additive that is reflective to infrared radiation, ultraviolet radiation, or both. Following the two size coat layers, a decorative layer 130 is disposed on the second size coat layer 124.

Figure 3:
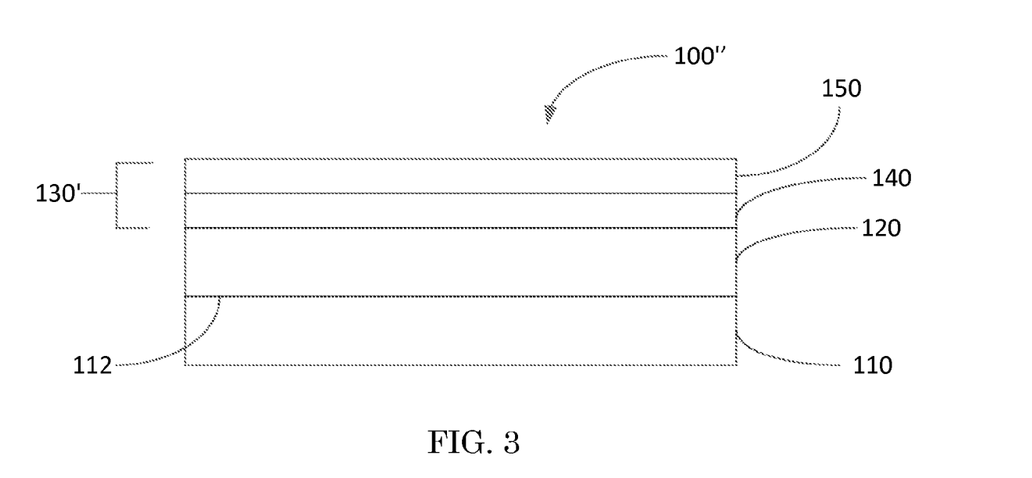
FIG. 3 is a schematic cross-sectional view illustrating components of a finished outdoor, weatherable panel.

FIG. 3 illustrates an outdoor weatherable panel 100" comprising a substrate 110 in accordance with another embodiment of the invention. Panel 100" is similar to panel 100 in FIG. 1 except that the size coat layer 120 in FIG. 3 comprises two size coat layers 122 and 124, and the decorative layer 130' in FIG. 3 comprises of a print coat layer 140 and a top coat layer 150. Substrate 110 has an upper surface 112. The substrate 110 comprises a plastic material. Size coat layer 120 is disposed on the upper surface 112 of substrate 110. Size coat layer 120 comprises an additive that is reflective to infrared radiation, ultraviolet radiation, or both. FIG. 3 illustrates further aspects of the decorative layer 130', which is shown as comprising print coat layer 140 is disposed on the size coat layer 120, and a top coat layer 150 disposed on the print coat layer 140.

It will be appreciated that in a configuration comprising a single size coat layer (e.g., FIG. 1), the decorative layer can comprise multiple layers (e.g., 140 and 150 as shown in FIG. 3), which layers can comprises a pigment that has a low absorbance or transmittance to UV radiation, IR radiation, or both.

The substrate in the panel structure can be formed from any suitable plastic material as desired for a particular purpose or intended use. Examples of suitable plastic materials include, but are not limited to, vinyl (e.g., PVC), polystyrene, acrylonitrile-butadiene-styrene (ABS), nylon, ethylene-vinyl acetate (EVA), polycarbonate, polyethylene, polypropylene, polyethylene terepthalate, thermoplastic olefins, acrylonitrile-styrene-acrylic (ASA), and alloys, blends or coextrusions of these resins.

The thickness of the substrate can be selected as desired for a particular purpose or intended use. In one embodiment, the substrate can have a thickness of about 40 mils to about 45 mils; from about 30 mils to about 60 mils; even from about 20 mils to about 400 mils. In one embodiment, the substrate can have a thickness of about 1000 microns to about 1150 microns; from about 770 microns to about 1550 microns; even from about 500 microns to about 10,200 microns.

The size coat layer or layers can be formed from any suitable coating composition to provide adhesion between the plastic sheet and the decorative layer, e.g., between the plastic sheet and a print layer. A non-limiting example of a suitable size coat material is an acrylic resin. In one embodiment, the size coat comprises a polymethylmethacrylate or polyethylmethacrylate-containing resin. Such a size coat formulation is sufficient for providing a good bond to an extrusion made from a PVC resin.

In embodiments in which a backing sheet is made from a thermoplastic olefin such as polypropylene or polyethylene, a different size coat can be used. In such an embodiment, the size coat can be made from a coating composition of a solution of a thermoplastic chlorinated polyolefin (CPO). An example of a suitable CPO size coat is a chlorinated polypropylene or chlorinated polyethylene, in which the coating composition contains about 10% to about 60% by weight of the CPO, and correspondingly, about 50% to about 90% by weight solvent.

In accordance with the present invention, the size coat is configured such that the size coat exhibits low transmittance and/or low absorbance to UV and/or IR radiation. In one embodiment, the size coat comprises an additive that is reflective or adapted to block UV radiation, IR radiation, or both. Prior size coat layers in outdoor plastic sheets or siding material have been provided as clear coats and other layers, e.g., the print layers, have been configured to limit the heat build up. Despite such efforts, heat build is still a significant issue in such panel constructions. The inventors have found, however, that a panel can be made more resistant to heat build by modifying the size coat layer.

The additive in the size coat layer can be selected as desired for a particular purpose or intended application provided the additive exhibits a property to retard or reduce the amount of UV or IR radiation that reaches the underlying plastic sheet. In one embodiment, the additive is a reflective pigment. In one embodiment, the additive can be chosen from a color pigment, a white pigment, a metallic pigment, or a combination of two or more thereof. In one embodiment, the size coat layer comprises a white pigment. Examples of white pigments that can be used include, but are not limited to, metallic pigments such as Polybatch White P8555 SD, available from A. Schulman Inc. and which is identified as a white color concentrate having a coated rutile titanium dioxide concentration of 50% by weight in a propylene homopolymer carrier resin; and Ampacet 110235 which is a white pigmented polyethylene concentrate available from the Ampacet Corporation; and Ampacet 110868. Non-limiting examples of metallic pigments include metallic powders, flakes, etc. In one embodiment, the metallic pigment is an aluminum based material such aluminum flake.

In one embodiment, the size coat layer(s) comprise a suitable thermoplastic resinous material such as an acrylic resin. In one embodiment, the acrylic resin has a white pigment. In one embodiment, the size coat layer comprises a polymethylmethacrylate or polyethylmethacrylate-containing resin and includes a white pigment. Such a white size coat layer formulation is especially useful in preventing degradation of the panel from ultraviolent and infrared radiation.

The amount of the additive in the size coat layer is selected to provide the panel with a desired level of resistance to heat build. In one embodiment, the size coat layer comprises the additive in an amount of from about 25 weight percent to about 70 weight percent; from about 35 weight percent to about 65 weigh percent; even from about 40 weight percent to about 55 weight percent. In one embodiment, the size coat layer comprises the additives, e.g., a pigment, in an amount of from about 30.43 weight percent to about 65.87 weight percent; from about 38.46 weight percent to about 60.63 weight percent; from about 44.82 weight percent to about 52.72 weight percent. In one embodiment, the size coat layer comprises a mixture of a white pigment and a metallic pigment, where the white pigment is present in an amount of from about 50 weight percent to about 70 weight percent, and the metallic pigment is present in an amount of from about from about 30 weight percent to about 45 weight percent. Here as elsewhere in the specification and claims, numerical values can be combined to form new and non-disclosed ranges.

In one embodiment the size coat layer can comprise a plurality of size coat layers, and one or more of the size coat layers can comprise the reflective additive. In one embodiment, each of the size coat layers comprises a reflective additive. The type and amount of reflective additive in the respective size coat layers can be the same or different. In one embodiment comprising a first size coat layer and a second size coat layer, the second coat layer has a higher loading than the first coat layer. In one embodiment, a panel construction comprises two size coat layers (such as, for example, the embodiment illustrated in FIG. 2), where the first size coat layer (the size coat layer adjacent the plastic sheet) comprises the reflective additive in an amount of from about 10 weight percent to about 70 weight percent; about 30 weight percent to about 70 weight percent; from about 35 weight percent to about 65 weight percent; even from about 40 weight percent to about 55 weight percent and the second size coat layer comprises a reflective additive in an amount of 50 weight percent to about 70 weight percent, and the metallic pigment is present in an amount of from about from about 30 weight percent to about 45 weight percent. In one embodiment, the white pigment is present in an amount of from about 50 weight percent to about 70 weight percent, and the metallic pigment is present in an amount of from about 30 weight percent to about 65 weight percent. Here as elsewhere in the specification and claims, numerical values can be combined to form new and non-disclosed ranges.

The size coat layer(s) can include other additives to promote the adhesion of the size coat to a particular surface. For example, polyvinyl acetate, polyacrylic acid, polyacrylate, a vinyl chloride/vinylacetate copolymer, polybutyl methacrylate, an ethylene/vinylacetate copolymer, etc. can be employed to promote adhesion to vinyl surfaces. In one embodiment, a size coat layer can include a fluoropolymer resin such as, for example, polyvinylidene fluoride (PVDF) or polyvinyl fluoride (PVF). Such additives can be present in the size coat layer in an amount of 0 weight percent to about 75 weight percent.

The size coat can have a total thickness of from about 0.001 mils to about 0.5 mils; from about 0.01 mils to about 0.25 mils; even from about 05 mills to about 0.15 mils. The size coat can have a total thickness of from about 0.025 microns to about 13 microns; from about 0.25 microns to about 6.4 microns; even from about 1.3 microns to about 3.8 microns. In one embodiment, the panel construction comprises a plurality of layers. In an embodiment comprising a plurality of layers, the individual size coats can be provided to have substantially the same thickness or can be provided with different thickness. In one embodiment, the panel comprises two size layers, where a first size coat layer (adjacent the substrate) has a thickness from about 0.001 mils to about 0.5 mils; from about 0.01 mils to about 0.25 mils; even from about 0.05 mils to about 0.15 mils; and the second size coat layer (disposed between the first size coat and the decorative layer) has a thickness of from about 0.001 mils to about 0.5 mils; from about 0.01 mils to about 0.25 mils; even from about 0.05 mils to about 0.15 mils. The first size coat can have a total thickness of from about 0.0025 microns to about 13 microns; from about 0.25 microns to about 6.4 microns; even from about 1.3 microns to about 3.8 microns. The second size coat can have a total thickness of from about 0.25 microns to about 13 microns; from about 0.0025 microns to about 6.4 microns; even from about 1.3 microns to about 3.8 microns. Here as elsewhere in the specification and claims, numerical values can be combined to form new and non-disclosed ranges.

The panel comprises a decorative layer (e.g., layer 130) to provide the panel with a desired aesthetic appearance. The decorative layer can be formed by one or more layers including, for example, one or more print layers, a top coat, etc. The decorative layer is not limited in any manner and can be selected to provide the panel with a desired decorative appearance.

The top coat layer is not particularly limited and can be selected to meet a particular need or intended application. The top coat can be formed as a transparent, or substantially transparent, thermoplastic synthetic resinous coating composition. The polymeric material for the clear coat can comprise various acrylics, urethanes, vinyls, fluoropolymers, and blends of two or more thereof. Polyvinylidene fluoride (PVDF) and polyvinyl fluoride (PVF) are particularly suitable fluoropolymers. An exemplary extrudable polymeric material comprises a blend of PVDF and acrylic resins. An acrylic resin component of the top coat can be a polymethylmethacrylate or a polyethylmethacrylate resin, or mixtures thereof, including methacrylate co-polymer resins, and minor amounts of other comonomers. An example of a suitable acrylic resin is a polymethyl methacrylate polymer (PMMA), although a polyethyl methacrylate polymer (PEMA) also can be used. The top coat also can include minor amounts of block copolymers and other compatibilizers to stabilize the blended PVDF and acrylic resin system and provide compatibility with the underlying film.

In one embodiment, the top coat comprises a blend of a thermoplastic fluorinated polymer and an acrylic resin as its principal components. The fluorinated polymer resin also can include copolymers and terpolymers of vinylidene fluoride or polyvinyl fluoride, or mixtures thereof. In one embodiment, the clear coat material comprises from about 50 to about 75 percent PVDF and from about 25 to about 50 percent acrylic resin, by weight of the total solids present in the PVDF/acrylic formulation. One thermoplastic fluorocarbon useful as the top coat is the PVDF known as Kynar®. This polymer is a high molecular weight polymer which provides a useful blend of durability and chemical resistance properties. The PVDF component comprises from 65% to 90% of the total solids present in the top coat. These solids ranges are based on the relative proportions of the PVDF and acrylic components only in the clear coat formulation. The clear coat can also include minor amounts of solids such as UV stabilizers, pigments, and fillers etc.

The topcoat can have a thickness as desired for a particular purpose or intended application. In one embodiment, the topcoat has dry film thickness of about 0.1 mils to about 1.5 mils. The top coat can have a dry film thickness of about 2.5 microns to about 38 microns. The top coat lacquer formulation produces a dry film form exterior outdoor weatherable coating having desired properties of hardness and abrasion resistance, along with weatherability properties such as UV resistance and resistance to water and humidity exposure.

The topcoat can be configured to provide a particular appearance including a desired gloss. In one embodiment, the top coat formulation can be provided such that a low gloss surface can be transferred to it from a matte release coat. In one embodiment, the top coat is formulated from a thermoplastic synthetic resinous coating which, in dry film form, softens and deforms under elevated temperatures so that three-dimensional impressions can be formed in its exterior surface during an embossing step, while replicating the micro-roughness from a matte release coat to produce the low gloss surface.

The print layers can be configured to provide the panel construction with a desired decorative appearance. The print layers can comprise a continuous color coat or another decorative coating such as, for example, a wood grain coating. The color coat may comprise the same resinous materials as the clear coat and to which pigments have added. The color coat can comprise a coating containing a fluoropolymer resin. In one embodiment, the color coat is a cast, weatherable color coat containing PVDF. In another embodiment, the color coat contains a blend of PVDF and an acrylic resin, such as polymethylmethacrylate or polyethylmethacrylate. The level of pigmentation in the color coat is typically 10 to 20 percent of total compound weight, but in some cases can be higher. Other minor amounts of solids such as UV stabilizers and fillers can be included. Mixed metal oxide pigments can be used as pigments because of their excellent heat and light stability and the availability of a black pigment which minimizes heat build-up in the wood grain decorated vinyl siding panel.

Figure 4:
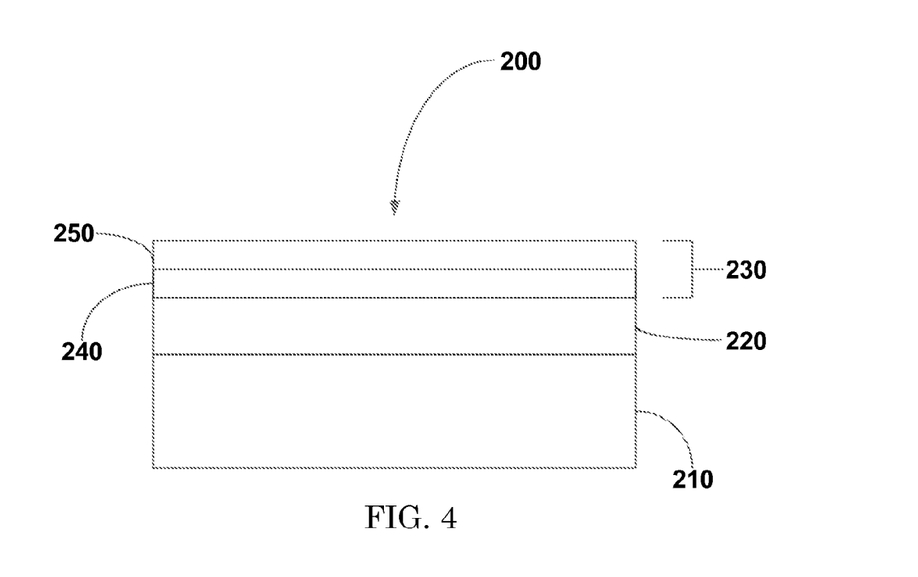
FIG. 4 is a schematic cross-sectional view illustrating components of another finished outdoor, weatherable panel.

In one embodiment, at least one of the layers in the decorative layer can comprise an additive that has a low transmittance or low absorbance to UV radiation, IR radiation, or both. In one embodiment illustrated in FIG. 4, an outdoor weatherable panel 200 comprises a substrate 210, a size coat layer 220, and a decorative layer 230, where the decorative layer comprises an additive that has a low transmittance or low absorbance to UV radiation, IR radiation, or both. In one embodiment, the decorative layer comprises an IR reflective pigment. The decorative layer 230 in FIG. 4 comprises a print coat layer 240 and a top coat layer 250. In accordance with aspects of the invention, at least one of the print coat layer, the top coat layer, or both comprise an additive that has a low transmittance or high reflectance to UV radiation, IR radiation, or both.

Suitable additives that can be used in the decorative layer include those described above with respect to the additives suitable for the size coat layer. The decorative layers, e.g., the print layer, can include such additives in an amount similar to the concentrations described above with respect to the size coat layers. In one embodiment, the color coat can comprise a pigment comprising an IR reflective component. In one embodiment, the pigment comprising an IR reflective component for use in the color coat can be any color pigment including, but not limited to, black, blue, violet, red, orange, yellow, green, brown, various shades and tones of such pigments, etc., or a combination of two or more thereof. In one embodiment where the decorative layer comprises the low transmitting or low absorbing additives, the size coat layer can be provided as a clear coat. In another embodiment where the decorative layer comprises the low transmitting or low absorbing additives, the size coat layer can be a size coat layer (or layers) as previously described herein in accordance with other embodiments of the invention that comprise the low transmitting or low absorbing additives.

The decorative layer can also include a print layer to provide a particular decorative appearance such as, for example, a wood grain appearance. The wood grain print coats can be formulated from a thermoplastic synthetic resinous coating composition containing an acrylic resin, such as polymethyl methacrylate or polyethyl methacrylate, or mixtures thereof, including methacrylate copolymer resins and minor amounts of other co-monomers; or the print coats can be made from a fluoropolymer resin, such as polyvinylidene fluoride (PVDF) or polyvinyl fluoride (PVF); or the print coats can be formulated of blends of fluoropolymer and acrylic resins. The level of pigmentation in the coating can range up to about 40% by volume on a solids basis, depending upon the depth of color needed for the particular wood grain pattern being printed. However, less than about 10% pigment by volume is suitable.

The dry coat weight of the wood grain print coats can range from about 0.1 to about 2.0 g/m².

The print coat layers and the topcoat layers are not generally limited. Examples of suitable print coat layers and the topcoat layers include, but are not limited to those disclosed in U.S. Pat. Nos. 5,284,693 or 6,336,988, each of which is incorporated herein by reference in its entirety. For example, the print layers and the topcoat layer can be provided with a desired surface finish. In one embodiment, the respective print or topcoat layers can be provided with a micro-roughness or matte finish to provide a low gloss surface. The surface finish can be selected or controlled to provide a surface exhibiting a desired gloss or distinctness-of-image (DOI).

Films and panels in accordance with the present invention exhibit improved properties in terms of resistance to heat build. In one embodiment, the panels exhibit a relatively high total solar reflectance. In one embodiment, the panels have a total solar reflectance of at least about 25%; at least about 30%; at least about 32%; even at least about 33%. In one embodiment, the panels have a total solar reflectance of from about 27% to about 35%; from about 30% to about 33%. In one embodiment, the panels exhibit low total solar reflectance heat build. With the improved total solar reflectance and resistance to heat build, the panels exhibit are not as susceptible to damage including warping and oil-canning.

A panel can be formed by any suitable methods or techniques for forming film constructions. Generally, a panel can be formed providing a substrate material in the form of a sheet or film, depositing at least one size coat layer on a surface of the substrate, and forming a decorative layer over the size coat layer that may be formed from a plastic sheet. The substrate can be formed from any number of known methods of making a plastic sheet, such as for example, extruding a plastic sheet. The size coat layer, print layers, and topcoat layers can be formed by any suitable coating technique including, for example, die coating, air knife, brush, curtain, extrusion, blade, floating knife, gravure, reverse roll, etc. In one embodiment, the panel can be formed by successive coating applications to provide the desired layers. In another embodiment, the panel can be formed by providing a substrate structure comprising a substrate layer coated with the size coat layer(s), providing a decorative print sheet comprising a carrier sheet comprising the topcoat layer and the respective print layers, and laminating the decorative print sheet to the substrate structure.

Suitable methods for forming a decorative panel construction are known to those skilled in the art. Examples of suitable methods for forming a panel, including for providing certain decorative finishes such as a low gloss surface or wood grain appearance, include the methods described in U.S. Pat. Nos. 5,284,693 and 6,336,988, each of which is incorporated herein by reference in its entirety.

While a decorative panel has been described with respect to various non-limiting embodiments, aspects of the invention can be further understood with respect to the following examples. The examples are for the purpose of further illustrating the invention and are not intended to limit the invention.

EXAMPLES

Panels are made by printing the size coat layers onto Red Cedar Graphicolor print layers available from Avery Dennison, and then laminated to a gray vinyl siding sheet available from Plygem. The panels include two size coat layers, the formulations for which are set out in Tables 1 and 2. Table 1 represents the first size coat layer (adjacent the vinyl), and Table 2 represents the second size coat layer (adjacent the print coat).

TABLE 1

| | | | | | First Size Coat | | | | | | |
|---|---|---|---|---|---|---|---|---|---|---|---|
| Panel | MEK | MPK | 7201 | 2010 | B78 | 2009 | I80160 | I80007 | L55700 | SS 7000-AR | PLATE |
| 1 | 42 | 42 | 7.2 | 8.8 | | | 67 | | | | 100HK |
| 2 | 42 | 42 | 3.52 | | 12.78 | | 67 | | | | 150HK |
| 3 | 42 | 42 | 0 | | | 16 | 67 | | | | 200HK |
| 4 | 42 | 42 | 3.52 | | 12.48 | | 50 | | | | 100HK |
| 5 | 42 | 42 | 0 | | | 16 | 50 | | | | 150HK |
| 6 | 42 | 42 | 7.2 | 8.8 | | | 50 | | | | 200HK |
| 7 | 42 | 42 | | 16 | | | 33 | | | | 150HK |
| 8 | 42 | 42 | 7.2 | | 8.8 | | 33 | | | | 200HK |
| 9 | 42 | 42 | 3.52 | | 12.48 | | | 13 | | | 100HK |
| 10 | 42 | 42 | 3.52 | | 12.48 | | | | | | 200HK |
| 11 | 42 | 42 | | 16 | | | | | 13 | | 100HK |
| 12 | 42 | 42 | 7.2 | | 8.8 | | | | | 13 | 150HK |
| 13 | 42 | 42 | 7.2 | | | 8.8 | | | 10 | | 150HK |
| 14 | 42 | 42 | 3.52 | 12.48 | | | | | | 10 | 200HK |
| 15 | 42 | 42 | | | 16 | | | 10 | | | 100HK |
| 16 | 42 | 42 | | | 16 | | | | 7 | | 200HK |
| 17 | 42 | 42 | 7.2 | | | 8.8 | | | | 7 | 100HK |
| 18 | 42 | 42 | 3.52 | 12.48 | | | | 7 | | | 150HK |

| Designation | Function | Supplier |
|---|---|---|
| MEK = Methyl Ethyl Ketone | Solvent | Univar |
| MPK = Methyl Propyl Ketone | Solvent | Univar |
| 7201 = Kynar 7201 | PVDF Resin | Arkema |
| 2010 = Elvacite 2010 | Acrylic Resin | Lucite International |
| BR78 = Dianal BR78 | Acrylic Resin | Dianal America |
| 2009 = Elvacite 2009 | Acrylic Resin | Lucite International |
| I80160 | White Dispersion | Avery Dennison |
| I80007 | Pre-washed | Gibraltar Chemical |
| L55700 | Metalure | Eckert |
| SS7000AR | Aluminum Pigment | Silberline |

TABLE 2

Second Size Coat

| Panel | MEK | MPK | 2010 | B78 | 2009 | UYHH | I80160 | I80007 | L55700 | SS 7000-AR | PLATE |
|---|---|---|---|---|---|---|---|---|---|---|---|
| 1 | 42 | 42 | 12.3 | | | 3.69 | 67 | | | | 100HK |
| 2 | 42 | 42 | | 14.08 | | 1.92 | 67 | | | | 150HK |
| 3 | 42 | 42 | | | 16 | 0 | 67 | | | | 200HK |
| 4 | 42 | 42 | | 16 | | 0 | 50 | | | | 100HK |
| 5 | 42 | 42 | | | 12.3 | 3.69 | 50 | | | | 150HK |
| 6 | 42 | 42 | 14.1 | | | 1.92 | 50 | | | | 200HK |
| 7 | 42 | 42 | 14.1 | | | 1.92 | 33 | | | | 150HK |
| 8 | 42 | 42 | | 16 | | 0 | 33 | | | | 200HK |
| 9 | 42 | 42 | | | 12.3 | 3.69 | 33 | | | | 100HK |
| 10 | 42 | 42 | | 14.08 | | 1.92 | | 13 | | | 200HK |
| 11 | 42 | 42 | 16 | | | 0 | | | 13 | | 100HK |
| 12 | 42 | 42 | | 12.3 | | 3.69 | | | | 13 | 150HK |
| 13 | 42 | 42 | | | 16 | 0 | | | 10 | | 150HK |
| 14 | 42 | 42 | 12.3 | | | 3.69 | | | | 10 | 200HK |
| 15 | 42 | 42 | | 14.08 | | 1.92 | | 10 | | | 100HK |
| 16 | 42 | 42 | | 12.3 | | 3.69 | | | | 7 | 200HK |
| 17 | 42 | 42 | | | 14.08 | 1.92 | | | 7 | | 100HK |
| 18 | 42 | 42 | 16 | | | 0 | | 7 | | | 150HK |

| Designation | Function | Supplier |
|---|---|---|
| MEK = Methyl Ethyl Ketone | Solvent | Univar |
| MPK = Methyl Propyl Ketone | Solvent | Univar |
| 2010 = Elvacite 2010 | Acrylic Resin | Lucite International |
| BR78 = Dianal BR78 | Acrylic Resin | Dianal America |
| 2009 = Elvacite 2009 | Acrylic Resin | Lucite International |
| UYHH | PVC Resin | Univar |
| I80160 | White Dispersion | Avery Dennison |
| I80007 | Pre-washed Aluminum | Gibraltar Chemical |
| L55700 | Metalure | Eckert |
| SS7000AR | Aluminum Pigment | Silberline |

Properties of the panels are evaluated for resistance to heat build. Initial adhesion is determined by ASTM D3359 Cross Hatch Adhesion Test. Adhesion after two weeks in 70 degrees Celsius water immersion is determined by ASTM D3359 cross hatch Adhesion Test. Total solar reflectance (TSR) is determined by ASTM Reference: C1549 and E903-96. Shepherd Test Method Reference: SCTM 340. TSR heat build is determined by ASTM Reference: E903-96, D4803-97. Shepherd Test Method Reference: SCTM 318. Journal Reference: T. Sullivan, G. Peake, USE OF REFLECTANCE SPECTRA TO PREDICT HEAT BUILDUP OF PIGMENTED PVC PANELS, Journal of Vinyl Technology 1993, 15, 232-239. Heat build ratio is determined by ASTM D4803-10 Standard Test Method for Predicting Heat Buildup in PVC Building Products. Table 3 shows the properties of the panels formed using the two size coat layers. The control panel is a panel that uses a clear size coat that does not contain any pigment.

TABLE 3

Initial Adhesion and Heat Build Test Ratio to Black

| Panel | Pigment Type in Size Coat Layer | Initial Adhesion | Adhesion after two weeks | Heat Build Test Ratio to Black | TSR (%) | TSR Heat Build |
|---|---|---|---|---|---|---|
| 1 | White | 100.00 | 99.00 | 0.76 | 33.30 | 27.70 |
| 2 | White | 100.00 | 80.00 | 0.76 | 33.10 | 27.80 |
| 3 | White | 98.00 | 100.00 | 0.76 | 33.00 | 27.80 |
| 4 | White | 100.00 | 70.00 | 0.83 | 33.20 | 27.60 |
| 5 | White | 100.00 | 100.00 | 0.76 | 32.60 | 27.90 |
| 6 | White | 100.00 | 100.00 | 0.87 | 33.30 | 27.60 |
| 7 | White | 100.00 | 100.00 | 0.78 | 32.80 | 27.90 |
| 8 | White | 100.00 | 100.00 | 0.73 | 33.10 | 27.70 |
| 9 | White | 100.00 | 99.00 | 0.82 | 33.30 | 27.70 |
| 10 | Metallic | 95.00 | 1.00 | 0.77 | 30.40 | 28.30 |
| 11 | Metallic | 100.00 | 95.00 | 0.80 | 28.70 | 29.90 |
| 12 | Metallic | 50.00 | 40.00 | 0.84 | 28.20 | 30.10 |
| 13 | Metallic | 99.00 | 80.00 | 0.79 | 30.30 | 28.50 |
| 14 | Metallic | 99.00 | 95.00 | 0.82 | 27.30 | 30.80 |
| 15 | Metallic | 100.00 | 50.00 | 0.75 | 28.80 | 29.60 |
| 16 | Metallic | 100.00 | 50.00 | 0.75 | 30.10 | 29.00 |
| 17 | Metallic | 99.00 | 95.00 | 0.82 | 37.00 | 30.90 |
| 18 | Metallic | 100.00 | 99.00 | 0.76 | 29.30 | 29.50 |
| Control | — | — | — | — | 30.40 | 29.7 |

The use of white pigments in the first and second size coat layers is desirable because of its excellent adhesion and heat build properties. White pigments performed higher than metallic pigments in reflecting ultraviolet and infrared light, thus minimizing heat build in the vinyl siding.

A comparison is made between the use of white and metallic pigments in the size coat layers. Trials 1-9 use a white pigment type having the following characteristics: the level of pigment in the first size coat is 40/13, the level of pigment in the second size coat is 40/13, the amount of size coats is 2×100 HK, the acrylic type is Elvacite® 2010, the percent of PVDF 7201 in the first size coat layer is 45%, the percent of UYHH in the second size coat layer is 23%, and the aluminum pigment use is I80007. In comparison, trials 10-18 use a metallic pigment type having the following characteristics:

the level of pigment in the first size is 33/10, the level of pigment in the second size is 33/10, the amount of size coats is 2×150 HK, the acrylic type is BR78, the percent of PVDF 7201 in the first size coat layer is 22%, the percent of UYHH in the second size coat layer is 12%, and the aluminum pigment use is L55700 (Metalure®).

As a follow-up to these tests, the addition of white pigment to the first and second size coat layers is found to provide excellent adhesive properties, in addition to providing reduced heat build in the vinyl product. Increased adhesiveness provides increased durability for an outdoor weatherable panel. Decreased heat build is advantageous because it reduces warping and oil canning of the outdoor weatherable panel.

Although the test results showed that the white pigment outperformed the metallic pigment in adhesiveness and heat build up, both white and metallic pigments are beneficial in providing a durable outdoor weatherable panel when compared to the use of a clear coat in the size coat layer.

Panels are constructed to evaluate the effect of a modified color coat layer on the heat build properties of a decorative panel. Panels 19-26 are made by printing a size coat layers onto print layers comprising pigment, and then laminated to a gray vinyl siding sheet available from Plygem. The pigments are described in Table 4.

TABLE 4

| Panel | Print Layer | Size Coat Layer | TSR (%) | Heat Build |
|---|---|---|---|---|
| 19 | DP39040 Black - No IR reflective additive | Clear | 22.6 | 32.0 |
| 20 | AV1-1101-2 BLACK DP39041 | Clear | 25.1 | 29.3 |
| 21 | AV1-1101-5 Eclipse BLACK DP39050 | Clear | 34.0 | 26.9 |
| 22 | AV1-1101-5 Eclipse BLACK DP39050 | White | 34.2 | 26.5 |
| 23 | Red Cedar Graphicolor (Control) | Clear | 32.7 | 29.7 |
| 24 | 90% AV1-1101-2 BLACK DP39041/10% White pigment | Clear | 24.3 | 30.7 |
| 25 | 90% AV1-1101-2 BLACK DP39041/10% white pigment | White | 24.4 | 30.6 |
| 26 | 80% AV1-1101-2 BLACK DP39041/20% white pigment | Clear | 24.9 | 30.6 |

DP39040 - black pigment with no IR reflective additive
AV1-1101-2 BLACK DP39041 - IR reflective black pigment
AV1-1101-5 Eclipse BLACK DP39050

As illustrated in Table 4, the use of the IR reflective pigments in the color coat layer can improve the total solar reflectance of the panel construction. Additional benefits can be achieved by providing a construction with (1) a color coat comprising IR reflective pigments, and (2) a size coat layer comprising IR reflective pigments.

The invention has been described in relation to its use with extruded plastic siding panels, although other similar uses are contemplated, such as window and door moldings, rain gutters, and other outdoor structures, for example.

The foregoing description identifies various, non-limiting embodiments of compositions comprising exfoliated boron nitride and methods of forming such compositions via the in situ exfoliation of boron nitride in a resin matrix. Modifications may occur to those skilled in the art and to those who may make and use the invention. The disclosed embodiments are merely for illustrative purposes and not intended to limit the scope of the invention or the subject matter set forth in the following claims.

What is claimed is:

1. An outdoor weatherable panel comprising:
   a substrate having an upper surface and comprising a plastic material;
   a decorative layer disposed above the upper surface of the substrate; and
   an at least one size coat layer disposed between the decorative layer and the substrate, the size coat layer comprising an additive that is reflective to infrared radiation, ultraviolet radiation, or both.

2. The panel of claim 1, wherein the additive is chosen from a color pigment, a white pigment, a metallic pigment, or a combination of two of more thereof.

3. The panel of claim 1, wherein the at least one size coat layer contains the pigment in an amount of from about 10 weight percent to about 70 weight percent.

4. The panel of claim 1, wherein the at least one size coat layer has a thickness of about 0.0025 microns to about 13 microns.

5. The panel of claim 1, wherein the at least one size coat layer comprises an acrylic resin.

6. The panel of claim 5, wherein the at least one size coat layer comprises a white pigment dispersed in the acrylic resin.

7. The panel of claim 1, comprising a single size coat layer.

8. The panel of claim 1, wherein the decorative layer comprises at least one print layer, the at least one print layer comprising a dark pigment.

9. The panel of claim 1, wherein the panel has a total solar reflectance of about 25% to about 35%.

10. The panel of claim 1, wherein the decorative layer comprises a pigment that is reflective to IR radiation.

11. An outdoor weatherable panel comprising:
    a substrate having an upper surface and comprising a plastic material;
    a decorative layer disposed above the upper surface of the substrate; and
    a first size coat layer and a second size coat layer, wherein the first size coat layer is disposed between the substrate and the second size coat layer, and the second size coat layer is disposed between the first size coat layer and the decorative layer, wherein the first size coat layer, the second size coat layer, or both comprise an additive that is reflective to infrared radiation, ultraviolet radiation, or both.

12. The panel of claim 11, wherein the first size coat layer comprises a first amount of the additive and the second size coat layer comprises a second amount of the additive, the amount of additive in the first size coat layer being about the same, greater than, or less than the amount of additive in the second size coat layer.

13. The panel of claim 11, wherein the first size coat layer comprises the additive in an amount of from about 10% weight percent to about 70% weight percent, and the second size coat comprises the additive in an amount of from about 10% weight percent to about 70% weight percent.

14. The panel of any of claim 11, wherein the first size coat layer and the second size coat layer independently comprise the additive, which is chosen from a color pigment, a white pigment, a metallic pigment, or a combination of two of more thereof.

15. The panel of any of claim 11, wherein the first size coat layer has a thickness of about 0.0025 microns to about 13 microns and the second size coat layer has a thickness of about 0.0025 microns to about 13 microns.

16. The panel of claim 14, wherein the first size coat layer has a first level of pigment loading and the second size coat layer has a second level of pigment loading, the first level of pigment loading being lower than the second level of pigment loading.

17. The panel of claim 11, wherein the first size coat layer, the second size coat layer, or both size coat layers comprise an acrylic resin.

18. The panel of claim 17, wherein the first size coat layer, the second size coat layer, or both size coat layers comprise a white pigment dispersed in the acrylic resin.

19. An outdoor weatherable panel comprising:
 a substrate having an upper surface and comprising a plastic material;
 a decorative layer disposed above the upper surface of the substrate, and wherein the decorative layer comprises a first additive that has a substantially low transmittance and/or low absorbance to infrared radiation, ultraviolet radiation, or both;
 an at least one size coat layer disposed between the decorative layer and the substrate, the size coat layer comprising a second additive that has a substantially low transmittance and/or low absorbance to infrared radiation, ultraviolet radiation, or both.

20. The outdoor weatherable panel of claim 19, wherein the first additive is a pigment is chosen from a black pigment, a blue pigment, a violet pigment, a red pigment, a orange pigment, a yellow pigment, a green pigment, a brown pigment, or a combination of two or more thereof.

\* \* \* \* \*